United States Patent Office 3,549,692
Patented Dec. 22, 1970

3,549,692
HETEROCYCLIC CATALYSTS FOR ESTERIFICATION OF AROMATIC DICARBOXYLIC ACIDS WITH CYCLIC CARBONATES OF ALKYLENE GYLCOLS
August Böckmann, Krefeld-Bockum, Hugo Vernaleken, Krefeld, Ludwig Bottenbruch and Hans Rudolph, Krefeld-Bockum, and Hermann Schnell, Krefeld-Urdingen, Germany, assignors to Farbenfabriken Bayer Aktiengesellschaft, Leverkusen, Germany, a corporation of Germany
No Drawing. Filed Aug. 28, 1967, Ser. No. 663,531
Claims priority, application Germany, Sept. 9, 1966, F 50,162
Int. Cl. C08g 17/015
U.S. Cl. 260—475　　　　　　　　　　　　　4 Claims

ABSTRACT OF THE DISCLOSURE

Esterification of aromatic dicarboxylic acids with cyclic carbonates of alkylene glycols in the presence of five-membered aromatic N-heterocyclic compounds containing two to four heterocyclic nitrogen atoms and transesterification of resulting esters to produce high molecular weight, fiber-forming polyesters.

---

The present invention relates to improvements in the production of esterification products of aromatic dicarboxylic acids by reacting said aromatic dicarboxylic acids under esterification conditions with cyclic carbonates of alkylene glycols in the presence of catalysts, and more especially to the use of heterocyclic nitrogen compounds as catalysts for the aforementioned reaction.

It is known to react terephthalic acid with cyclic 1,2-glycol-carbonates at elevated temperatures to give oligo- and poly-terephthalic acid glycol esters (U.S. patent specification Nos. 2,802,807 and 2,799,677).

The catalysts hitherto used for accelerating this reaction, such as alkali metal carbonates, antimony trioxide, cerium dioxide, zinc borate, magnesium acetate, lead acetate, and the like, prove to be little effective at the desired low reaction temperatures (about 160–220° C.). They necessitate long reaction times which promote side reactions, such as ether formation, and cause discolorations in the reaction product.

According to the present invention tautomeric, five-membered aromatic N-heterocycles containing two to four heterocyclic nitrogen atoms are used as catalysts for the reaction of aromatic dicarboxylic acids with cyclic glycol carbonates.

It has been found that, surprisingly, the catalytic effectiveness of these compounds by far surpasses that of the known catalysts and that the aforementioned disadvantages are obviated in their use.

Examples of the catalysts to be used according to the invention are the following: imidazole, 2-alkyl-imidazoles, preferably such having 1–4 carbon atoms in the alkyl group, for instance 2-methyl-, 2-allyl-benzimidazole, dialkyl imidazoles having 1–4 carbon atoms in the alkyl group such as 2,4- or 4,5-dimethyl imidazoles, benzimidazole, 2-alkyl-benzimidazole, such as 2-methyl- or 2-alkyl-benzimidazoles having 1–4 carbon atoms in the alkyl group, pyrazole, benzopyrazole, triazole, 3,5-dimethyl-1,2,4-triazole, tetrazole, 5-phenyl-tetrazole. The catalysts are expediently used in amounts of about 0.01 to about 5% by weight, as calculated on the weight of the reactants. The preferred catalysts are imidazole and derivatives of imidazoles.

The catalysts may be used in each case by themselves, but also in admixture with one another, as well as in admixture with oxides of the metals of Groups IV, V and VI (including both Chief and Minor Sub-Groups) of the Mendeleev Periodic Classification, such as titanium, germanium, tin, antimony, lead, bismuth, niobium, tantalum, thorium, uranium.

Suitable aromatic dicarboxylic acids with which the cyclic glycol carbonates can be reacted are, for example terephthalic acid, phthalic acid, isophthalic acid, naphalene- dicarboxylic acids, such as —1,8, —1,4, —1,2, hydroxyphenyl-dicarboxylic acid such as 2-hydroxy-terephthalic acid, 5-hydroxy-isophthalic acid, 4-hydroxy-phthalic acid, and alkyl-phenyl-dicarboxylic acids, such as 2-methyl-terephthalic acid, 3-methyl-phthalic acid, tetramethyl-phthalic acid. 5-isobutyl-isophthalic acid. The preferred acid is terephthalic acid.

Cyclic carbonates which are suitable for the reaction with the aromatic dicarboxylic acids are the cyclic carbonates of ethylene-glycol and 1,2-propane-diol.

The aromatic dicarboxylic acid is expediently reacted with the cyclic glycol carbonate in a molar ratio of about 1:2, at temperatures between 120 and 250° C., preferably at 160 to 220° C., in the presence of the above catalysts, to give essentially aromatic dicarboxylic acid-bis-β-hydroxyalkyl esters which may be transesterified in a second process step known as such to give fibre forming polyesters. It is also possible to start the reaction with a molar ratio of aromatic dicarboxylic acid to cyclic glycol carbonate of 1:0.5 to 1:1.5 and to add the remaining portion of glycol carbonate to the reaction mixture in the degree as dicarboxylic acid-bis-β-hydroxyalkyl ester is formed.

The molar proportions of total dicarboxylic acid and total cyclic carbonate may vary between about 1:1.5 and 1:2, and mixtures of dicarboxylic acid mono- and -bis-hydroxyalkyl esters, oligo- and non-fibre forming polydicarboxylic acid glycol esters are formed when using the reactants in a proportion other than 1:2. These mixtures are also capable of being transesterified in a second process step to give fibre forming polyesters.

This transesterification to produce high molecular weight, fibre forming polyesters may be carried out at temperatures of about 250° to 300° C., preferably under low presusre, for example a pressure of the order of 5 mms. of mercury or less. This reaction may be carried out in the presence of an ester-interchange catalyst known as such. Suitable ester-interchange catalysts are the above cited oxides of the metals of Groups IV, V and VI of the Mendeleev Periodic Classification. As indicated above it is preferred to apply these catalysts together with the heterocyclic catalysts of the invention, however, it is also possible to introduce the ester-interchange catalysts into the reaction mixture at the beginning of the second process step. The ester-interchange catalysts may be used in amounts of 0.1 to 2% by weight as calculated on the weight of the reaction mixture.

The following examples illustrate the process according to the invention.

EXAMPLE 1

41.5 parts by weight terephthalic acid (¼ mol), 44.0 parts by weight cyclic ethylene glycol carbonate (½ mol) and 0.085 part by weight of one of the catalysts, described below in more detail, are intimately mixed. In a flask, the mixture is placed into a heating bath which is constantly kept at 200° C., while stirring. The temperature in the reaction flask amounts to about 175° C. The time required for splitting of 5.6 liters $CO_2$ is taken as the measurement for the effectiveness of the catalyst.

After splitting off the total amount of $CO_2$, the ester obtained with imidazole as catalyst has an acid number of 3 to 4 and an OH number of ≥390.

3

Table I shows the results of the experiments:

TABLE I

| Catalyst | Bath temperature as ° C. | Time for splitting off 5.6 litres $CO^2$, mins. |
|---|---|---|
| Number: | | |
| (a) Imidazole | 200 | 29 |
| (b) Imidazole plus 0.085 part by weight antimony trioxide. | 200 | 33 |
| (c) Benzimidazole | 200 | 36 |
| (d) 2-methylbenzimidazole | 200 | 48 |
| (e) Potassium carbonate | 200 | 73 |
| (f) Triphenylphosphine | 200 | 75 |
| (g) Sodium carbonate | 200 | 93 |
| (h) Calcium acetate | 200 | 109 |
| (i) Barium acetate | 200 | 112 |
| (j) Antimony trioxide | 200 | 113 |
| (k) Magnesium acetate | 200 | 126 |
| (l) Dibutyl tin oxide | 200 | 129 |
| (m) Tricyclohexylphosphine | 200 | 132 |
| (n) Lead(II)-acetat | 200 | 152 |
| (o) Cerium dioxid | 200 | 157 |
| (p) Zinc acetate | 200 | 182 |
| (q) Nil | 200 | 230 |

EXAMPLE 2

41.5 parts by weight terephthalic acid (¼ mol), 44.0 parts by weight cyclic ethylene glycol carbonate (½ mol) and 0.085 part by weight of one of the catalysts, described below in more detail, are treated as in Example 1. The temperature of the heating bath amounts to 230° C. (about 195° C. in the reaction flask). After splitting off the total amount of $CO_2$ the ester obtained with imidazole as catalyst has an acid number of 3 to 4 and an OH number of 388 to 390.

Table II shows the results of the experiments.

TABLE II

| Catalyst | Bath temperature as ° C. | Time for splitting off 5.6 litres $CO^2$, mins |
|---|---|---|
| Number: | | |
| (a) Imidazolz | 230 | 15 |
| (b) Imidazole plus 0.085 part by weight antimony trioxide. | 230 | 16 |
| (c) Benzimidazole | 230 | 19 |
| (d) 2-methylbenzimidazole | 230 | 23 |
| (e) Benzotriazole | 230 | 27 |
| (f) Dimethyl-1,2,4-triazole | 230 | 27 |
| (g) 3,5-dimethylpyrazole | 230 | 28 |
| (h) 5-phenyltetrazole | 230 | 37 |
| (i) Zinc borate | 230 | 52 |
| (k) Magnesium acetate | 230 | 53 |
| (l) Aluminium trichloride | 230 | 60 |
| (m) Nil | 230 | 62 |

EXAMPLE 3

41.5 parts by weight phthalic acid (¼ mol), 44.0 parts by weight cyclic ethylene glycol carbonate (½ mol) and 0.085 part by weight of one of the catalysts, described below in more detail, are treated as in Example 1. The temperature of the heating bath amounts to 230° C.

(a) Catalyst: imidazole;
  5.6 litres $CO_2$ were split off with 60 minutes.
(b) Catalyst: potassium benzoate;
  5.6 litres $CO_2$ were split off within 162 minutes.
(c) Catalyst: magnesium acetate;
  only 0.6 litre $CO_2$ were split off within 220 minutes.
(d) Catalyst: antimony trioxide;
  only 1.5 litres $CO_2$ were split off within 220 minutes.
(e) Catalyst: nil;
  only 1.5 litres $CO_2$ were split off within 220 minutes.

EXAMPLE 4

41.5 parts by weight terephthalic acid (¼ mol), 51.0 parts by weight propylene glycol-1,2-carbonate and 0.092 part by weight of one of the catalysts, described below in more detail, are treated as in Example 1. The temperature of the heating bath amounts to 230° C.

4

(a) Catalyst: imidazole;
  5.6 litres $CO_2$ split off within 51 minutes.
(b) Catalyst: potassium benzoate;
  3.05 litres $CO_2$ split off within 200 minutes.
(c) Catalyst: magnesium acetate;
  2.65 litres $CO_2$ split off within 200 minutes.
(d) Catalyst: antimony trioxide;
  only 0.5 litre $CO_2$ are split off within 200 minutes.
(e) Catalyst: nil;
  0.7 litre $CO_2$ split off within 200 minutes.

EXAMPLE 5

0.2 mole (50.8 g.) of terephthalic acid diglycol ester obtained according to the prescription of Example 2 is mixed with 0.04 mole-percent of calcium acetate and 0.01 mole-percent of antimony-III-oxide. The mixture is subjected while stirring and under nitrogen to the following conditions of time/temperature/pressure:

| Time, minutes | Temperature, ° C. | Pressure, torr |
|---|---|---|
| 15 | 250 | 760 |
| 15 | 250 | 100 |
| 15 | 285 | 10 |

During the heating 0.18 mole (11.2 g.) of glycol are distilled off. Thereafter the melt is kept while stirring for 60 minutes at a temperature of 185° C. and under a pressure smaller than 0.5 torr. The product obtained has a relative viscosity of 1.87 measured at 25° C. in a solution containing 10 g. of the product dissolved in 1,000 ml. of a solvent consisting of 1 part by weight of phenol and 1 part by weight of tetrachloro ethane.

What we claim is:

1. A process for producing an ester of an aromatic dicarboxylic acid and a cyclic glycol carbonate, said process comprising reacting an aromatic dicarboxylic acid and a cyclic glycol carbonate at a temperature between 120 and 250° C. and in the presence of a catalytic amount of a five-membered aromatic N-heterocyclic compound containing two to four heterocyclic nitrogen atoms.

2. The process of claim 1 wherein said catalyst is an imidazole.

3. The process of claim 1 wherein catalytic amounts of oxides of the metals of Groups IV, V and VI of the Mendeleev Periodic Classification are used together with said aromatic N-heterocyclic compound.

4. The process of claim 1 wherein said aromatic dicarboxylic acid is terephthalic acid and said cyclic glycol carbonate is cyclic ethylene glycol carbonate.

References Cited

UNITED STATES PATENTS

| 3,462,395 | 8/1969 | Wiener | 260—75 |
| 3,050,548 | 8/1962 | Munro | 260—475 |
| 3,055,868 | 9/1962 | McIntyre | 260—75 |
| 3,215,731 | 11/1965 | Bearden | 260—486 |
| 2,789,964 | 4/1957 | Reynolds et al. | 260—47 |
| 2,799,664 | 7/1957 | Drewitt et al. | 260—45.4 |
| 2,870,124 | 1/1959 | Ham | 260—75 |
| 3,211,702 | 10/1965 | Van Gijzen | 260—77.5 |
| 3,329,652 | 7/1967 | Christie | 260—47 |

OTHER REFERENCES

Bruice, Fife, Bruno, Benkovic, J. Am. Chem. Soc., 84, 3012–13 (1962).

JOSEPH L. SCHOFER, Primary Examiner

C. A. HENDERSON, Jr., Assistant Examiner

U.S. Cl. X.R.

260—75, 78.4